Patented June 22, 1948

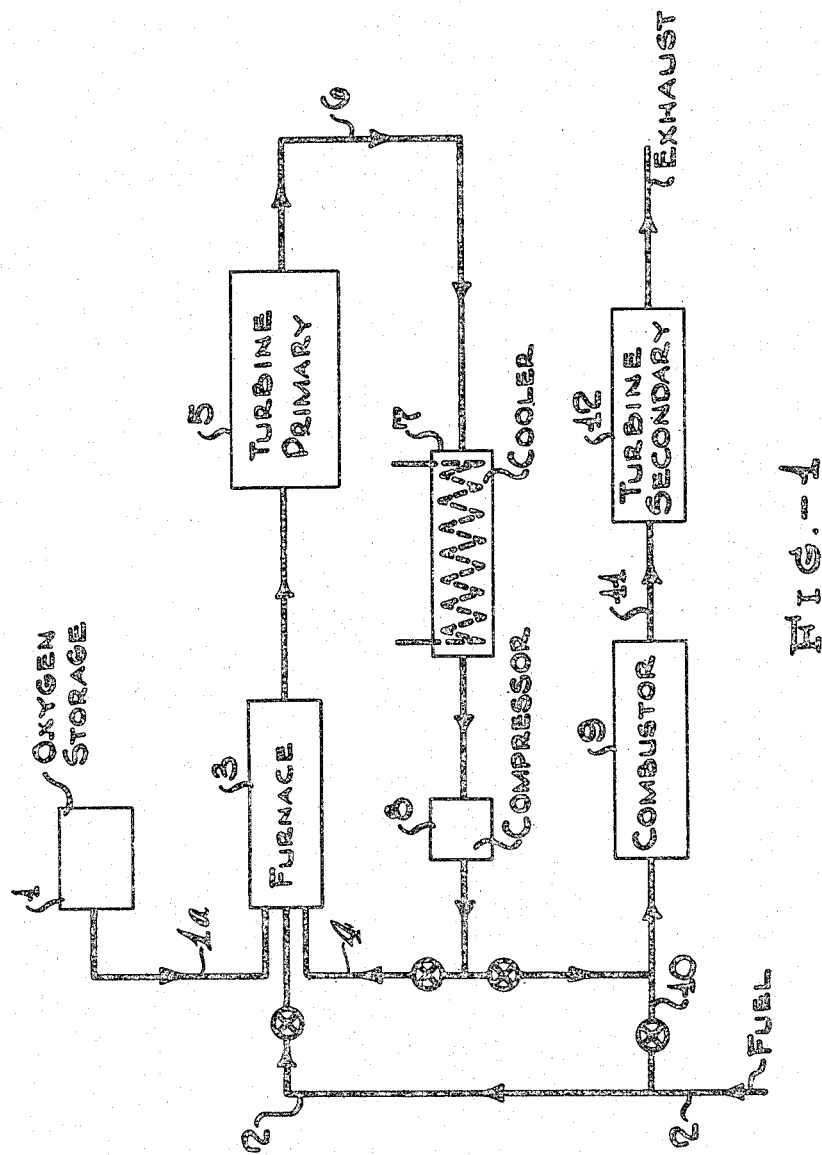

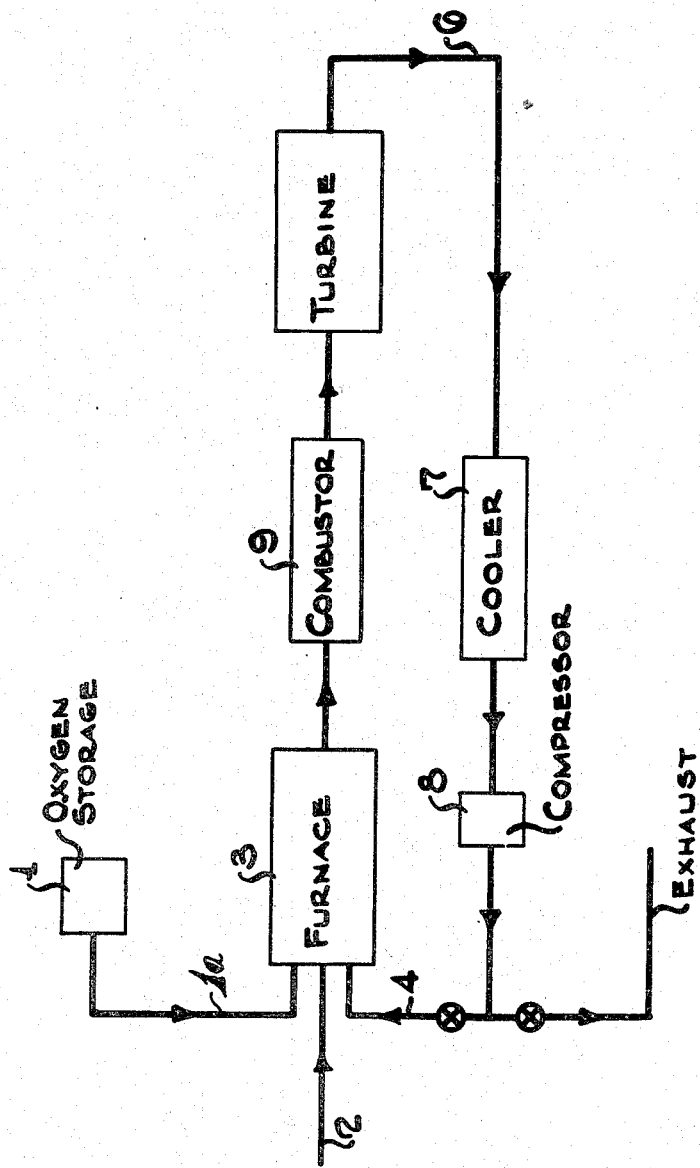

2,443,841

UNITED STATES PATENT OFFICE 2,443,841

PROCESS FOR POWER GENERATION

William J. Sweeney, Summit, Gould H. Cloud, Linden, and Albert J. Blackwood, Westfield, N. J., assignors to Standard Oil Development Company, a corporation of Delaware Application December 20, 1944, Serial No. 569,062

6 Claims. (Cl. 60—41)

The present invention relates to the generation of power by means of gas turbines and more particularly by the use of turbines operating on combustion gases produced from enriched air. The invention will be fully understood from the following description and the drawings.

Fig. 1 is a diagrammatic plan showing an arrangement of equipment for generating power by means of a gas turbine and Fig. 2 shows an alternate arrangement.

In most power generating plants, the fuel is burned with ordinary atmospheric air and the use of enriched air containing more than 21% oxygen has not been employed because of the added cost entailed in enriching the air. Nevertheless there are certain applications where this is quite useful and advantage should be taken of it. One such instance is in the operation of a power plant below water surfaces where access to atmospheric air is prevented, and a second instance is in the employment at high altitude where atmospheric air although available is so rarefied as to require excessive supercharging. In such cases and others it is advantageous to supply enriched air.

One of the problems encountered when enriched air is employed involves the excessively high combustion temperatures reached and the difficulty of obtaining metals and other materials for construction for this service. It has been proposed that this can be solved by the recirculation of cooled exhaust gas. By this means the temperature of combustion may be reduced to an operative range.

Referring to the drawing, Fig. 1, numeral 3, denotes a combustion zone or furnace of any desired design depending on whether the plant is to be stationary or movable and on the size of the unit. One suitable construction consists of a tubular shell lined with refractory brick, Carborundum or the like, into which the fuel is passed by means of a pipe 2. Oxygen or enriched air is added by a pipe 1a from any convenient source 1, such as, for example, high pressure bottles or other equipment, to hold liquid air.

The otherwise excessively high combustion temperature is controlled or reduced by the addition to the furnace 3 of a controlled volume of cooled exhaust gas by means of pipe 4 which will be described later.

This gas mixture which may be at a temperature of about 800° to 1200° F. or higher is discharged directly into a gas turbine shown diagrammatically at 5. Power is taken from the turbine and is used as desired. The turbine exhausts through a pipe 6 to a cooler 7 which may be of the ordinary closed type of indirect cooler or it may be replaced by a scrubber in which water is brought into direct contact with the exhaust gases, cooling them and at the same time removing condensed liquid and dissolving carbon dioxide.

The cooled gas is now recompressed at 8 and a part of it is fed back to the furnace 1 by means of a pipe 4 referred to previously. In order to operate the furnace 1 effectively, it is found desirable to provide a substantial amount of excess air or oxygen so that the recompressed gas referred to above will contain oxygen which cannot be wasted. That portion of the gas which is not returned to furnace 3 is therefore passed through a catalytic combustor 9 to which a carefully controlled amount of additional fuel is added at 10. The combustor may be of any particular desirable design but in general it would consist of a tube filled with catalytic material in lump or pellet form. The gas and fuel passing through the combustor rapidly burn with a high degree of efficiency so that the gases discharged at 11 contain very little oxygen. The heat so generated may be directly absorbed and usefully employed in any way desired; for example, if preferred the catalytic combustion gas may be passed through a secondary turbine shown at 12 for the production of additonal power.

In Fig. 2, the same numbers are applied to the corresponding pieces of equipment described in connection with Fig. 1. The arrangement differs from the above in that the combustor 9 is placed between the primary furnace and the initial or primary turbine. In this case no secondary turbine is required since the single turbine shown serves the purpose of both of those employed in the arrangement described previously.

In the present process it will be observed that the feed is first burned with a gas richer in oxygen than air and the excessive combustion temperatures are controlled by the recirculation of cooled exhaust gas furnished by the process itself. To operate effectively it is found that there must be a substantial amount of excess oxygen during this combustion. This will vary depending on the different designs but in general it will be of the order of 20 to 50%. However, it should be noted that this excess oxygen cannot be wasted because of the high expense of enriched air and it is cleaned up by means of the catalytic combustor which will very efficiently burn the fuel with excess air. Additional fuel is added to the combustor, the amount of which is carefully controlled to clean up the excess oxygen. The energy generated may also be converted to power as shown.

In the present process the source of the oxygen is most conveniently commercially pure oxygen obtained by the liquefaction and distillation of air and contains upward of 90% oxygen. The amount of the cooled exhaust gas recycled in the process depends on its temperature and on the combustion temperature that can be tolerated but in general it will amount to some two to five times the volume of the oxygen supplied, and it is preferable to cool this recycled gas to about 400° F. or below before it is added to the furnace. If desired, recycled gas may be admixed with oxygen before this mixture is added to the furnace and this mixture should contain from 10 to 50% oxygen. On the other hand, the two gases may be supplied directly to the furnace without any particular difficulty.

The catalytic combustor when used in connection with liquid or gaseous fuels is well understood and a detailed description should not be required. The catalytic material is to be of a refractory nature and if the temperature is above about 1000° F., no particular active constituent is required, the action being largely a surface phenomenon shown by all refractory materials at high temperatures; pebbles, pumice, clay pellets and the like may be employed. Where somewhat lower temperatures prevail, a more active catalyst is desired and those containing manganese oxides or salts of chromia and the like are well known catalysts for the purpose. At very low temperatures, a commercial product known as Hopcalite is useful.

We claim:

1. In the combustion turbine process for generating power, the improvement which comprises the utilization of an excess of combustion supporting gas which is enriched by the addition of oxygen to burn fuel, preventing excessive combustion temperature by the addition of a suitable volume of cooled exhaust gas, expanding the hot gases so obtained incident to the conversion of the thermal energy thereof into mechanical energy, adding additional fuel to the expanded gas in controlled quantities and subjecting the same to catalytic combustion whereby the oxygen content of said gases is stoichiometrically combusted.

2. The improved process according to claim 1 in which the combustion gases resulting from the said catalytic combustion are subjected to expansion incident to the conversion of thermal energy into mechanical energy.

3. Improved process according to claim 1 in which the initial combustion gases are immediately expanded incident to the conversion of thermal energy thereof into mechanical energy, the expanded gases cooled, a portion of the cooled gas recirculated to the initial combustion zone and the remainder subjected to said catalytic combustion.

4. Improved process according to claim 1 in which the initial combustion gas is expanded immediately, incident to the conversion of the thermal energy thereof into mechanical energy, the expanded gas cooled and subjected to said catalytic combustion with additional fuel and thereafter reexpanded incident to the conversion of the thermal energy thereof into mechanical energy.

5. An improved combustion turbine process for generating power which comprises burning a fuel in a primary combustion zone with a combustion supporting gas enriched with oxygen derived from a source in which the oxygen content is greater than air, preventing excessive combustion temperature by the addition of cooled exhaust gas, expanding the resulting combustion gas incident to the conversion of thermal energy thereof into mechanical energy, cooling the expanded gas, recompressing the expanded gas, supplying a portion thereof for the control of the temperature in the primary combustion stage, adding a controlled quantity of fuel to the remaining portion of the gas and subjecting the same to catalytic combustion whereby the oxygen content of said gas is stoichiometrically combusted and reexpanding the products of catalytic combustion incident to conversion of the thermal energy thereof into mechanical energy.

6. In a plant for the generation of power, a system comprising a furnace, means for introducing into said furnace fuel, oxygen in controlled concentration and exhaust gas from a previous combustion cycle, a gas turbine, means for introducing the combustion products of said furnace into said turbine, means for cooling and compressing exhaust gas of said turbine, means for recirculating a portion of said exhaust to said furnace, means for mixing the remaining exhaust gas with a controlled quantity of additional fuel, means for catalytic recombustion of the resulting mixture, and means for expanding the combustion products of secondary combustion.

WILLIAM J. SWEENEY.
GOULD H. CLOUD.
ALBERT J. BLACKWOOD.

REFERENCES CITED

The following references are of record in the file of this patent:

UNITED STATES PATENTS

| Number | Name | Date |
|---|---|---|
| 2,303,381 | New | Dec. 1, 1942 |